US006941224B2

(12) United States Patent
Fukuyasu

(10) Patent No.: US 6,941,224 B2
(45) Date of Patent: Sep. 6, 2005

(54) METHOD AND APPARATUS FOR RECORDING VOICE AND LOCATION INFORMATION

(75) Inventor: Akio Fukuyasu, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 10/289,298

(22) Filed: Nov. 7, 2002

(65) Prior Publication Data

US 2004/0204851 A1 Oct. 14, 2004

(51) Int. Cl.[7] ........................ G01C 21/26; G01C 21/28; G01C 21/34; G01C 21/36

(52) U.S. Cl. ............................ 701/213; 701/1; 701/14; 701/200; 700/245; 709/227; 704/270; 379/211.02; 379/88.04

(58) Field of Search ................................ 701/213, 200, 701/1, 14; 709/227; 704/270; 379/211.02, 88.04; 700/245

(56) References Cited

U.S. PATENT DOCUMENTS

| | | | | | |
|---|---|---|---|---|---|
| 5,848,373 | A | * | 12/1998 | DeLorme et al. | 701/200 |
| 5,901,214 | A | * | 5/1999 | Shaffer et al. | 379/211.02 |
| 6,112,141 | A | * | 8/2000 | Briffe et al. | 701/14 |
| 6,707,421 | B1 | * | 3/2004 | Drury et al. | 342/357.1 |
| 6,707,889 | B1 | * | 3/2004 | Saylor et al. | 379/88.04 |
| 2001/0029410 | A1 | * | 10/2001 | Obradovich | 701/1 |
| 2002/0065585 | A1 | * | 5/2002 | Obradovich | 701/1 |
| 2002/0082752 | A1 | * | 6/2002 | Obradovich | 701/1 |
| 2002/0143548 | A1 | * | 10/2002 | Korall et al. | 704/270 |
| 2003/0004802 | A1 | * | 1/2003 | Callegari | 705/14 |
| 2003/0055983 | A1 | * | 3/2003 | Callegari | 709/227 |
| 2004/0104842 | A1 | * | 6/2004 | Drury et al. | 342/357.13 |

FOREIGN PATENT DOCUMENTS

| | | |
|---|---|---|
| JP | A-H07-71972 | 3/1995 |
| JP | A-H07-321957 | 12/1995 |
| JP | A-H08-30829 | 2/1996 |
| JP | A-H08-182053 | 7/1996 |
| JP | A-H10-63182 | 3/1998 |
| JP | A-H11-94571 | 4/1999 |
| JP | A-H11-134268 | 5/1999 |
| JP | A-2000-181814 | 6/2000 |
| JP | A-2000-244683 | 9/2000 |
| JP | A-2001-141498 | 5/2001 |

OTHER PUBLICATIONS

Crosbie, Satellite mobile communications from the year 200, 1992, IEEE, pp. 5/1–5/6.*

Barnett, A vocal data management system, 1973, IEEE, pp. 185–188.*

* cited by examiner

*Primary Examiner*—Thomas G. Black
*Assistant Examiner*—McDieunel Marc
(74) *Attorney, Agent, or Firm*—Posz Law Group, PLC

(57) ABSTRACT

A recording apparatus for a navigation device allows a user to make a voice recording in association with a vehicle location. The current location of the vehicle is determined by a GPS sensor. The location of the vehicle at the time of the recording is indicated by a mark on a displayed map of the surroundings, and the time at which the recording was made is displayed. Also, if a telephone is connected to the navigation system, the navigation system records and stores calls. The location of the vehicle at the time of a call is displayed on a map with a mark. The navigation system plays the recording when the vehicle operator selects the mark.

31 Claims, 7 Drawing Sheets

METHOD AND APPARATUS FOR RECORDING VOICE AND LOCATION INFORMATION

CROSS REFERENCES TO RELATED APPLICATIONS

This application relates to and incorporates by reference Japanese patent application No. 2001-141759, which was filed on May 11, 2001.

BACKGROUND OF THE INVENTION

The present invention relates to an information recording apparatus that is capable of recording a voice associated with the location and time of voice utterance (speech utterance).

Conventional automobile navigation systems provide the travel position of the vehicle to the driver by presenting a map of the surroundings and provide guidance on the route to the desired destination in accordance with information regarding the current location of the vehicle received by a GPS (Global Positioning System) receiver. The navigation system is provided with a display device for presenting a map of the vehicle surroundings.

Such navigation systems are provided with a variety of capabilities. For example, the user can pre-register a desired location to display a map of surroundings of the location readily with the push of a button. In addition, with a simple push of a button, the user can set the location to a destination, allowing the navigation system to provide the route to the destination. In a navigation system having such capabilities, a key entry system is employed to input a location and the characters indicative of the location. For example, when the user has found a favorite shop, the user can input the name of the shop or the like by text, so that the user can confirm the location of the shop on a map or the navigation system can provide the information on the route to the shop when the user wants to revisit the shop afterwards.

On the other hand, some navigation systems designed for home delivery service or collection and delivery service can record the time of visit to each home as well as a selection of the purpose of visit or the like in a pre-registered list. The user can use these capabilities to keep logs of his or her job with the navigation system. On the other hand, some other navigation systems retrieve data provided by various sensors located inside the vehicle and then store the data as history data, which the user can use for the purpose of operation management of the vehicle.

However, the aforementioned prior art presents the following disadvantages. For example, when the user registers a favorite location, the user has to identify the location with a limited number of characters. To register a shop, the user is allowed to input, e.g., only the name and type of the shop. In other words, since the user cannot store details about the registered location in the navigation system, the user may not be able to recall the nature of a registered location at a later time.

Furthermore, with the aforementioned navigation system for business use, the key entry system allows the user to only select an appropriate purpose of visit from a classified list and record it. Thus, to record detailed purposes of visits to prepare a job log, the user has to take hand-written notes of the details in a notebook.

Furthermore, since the user has to touch keys to use the aforementioned capabilities of the navigation system, it is necessary to stop the vehicle to record the desired information in the navigation system.

In addition, since the data provided by each sensor located inside the vehicle can be automatically recorded but indicates only those events related to the running conditions of the vehicle, the user cannot record detailed events that are caused by human factors.

SUMMARY OF THE INVENTION

The present invention has been developed in view of these problems. It is therefore an object of the present invention to provide an information recording apparatus that allows a memorandum of speech (utterance) to be taken in association with a location.

An information recording apparatus, according to a first aspect of the present invention, has storage means for storing voiced information, received by voice input means, and a current location, determined by current location determining means, upon reception of the voice input, such that the location is stored in association with the voiced information. For this reason, using the information recording apparatus of the present invention, the user can not only record details concerning a location but can also confirm the location of the recording upon checking the contents of the voice recording.

The storage means may include a storage medium, such as a memory or hard disk (a magnetic disk) built into the apparatus, for storing voice information. Alternatively, voice information can be stored in an external storage medium connected to the apparatus, such as a floppy disk, a magneto-optical disk (MO), or a memory card.

In addition, according to a second aspect of the present invention, the storage means may be configured to store a recording of a call made via communication means. This allows the user to confirm the location and the contents of the call upon playback of the recording.

Furthermore, according to a third aspect of the present invention, the information recording apparatus according to the first or second aspect has display control means for displaying on display means a map image containing a current location (record position) stored on the storage means in accordance with map data as well as for displaying the record position of the voice in the form of a visible representation of the voice input at an associated position of the map image on the display means. This allows the user to confirm the location of voice utterance (speech utterance) on the map, and readily ascertain where the voice has been uttered only by viewing the map. As a result, it is not necessary for the user to say any words indicative of the location to be stored in the apparatus, and therefore the contents of the voice to be stored can be simplified. Additionally, even when the user does not know the location of voice utterance, the apparatus can store the location.

For example, to present a visible representation of a voice input, the display control means may display on the display means a mark indicative of the record position overlapping the map image.

On the other hand, the information recording apparatus according to a fourth or fifth aspect of the present invention has the storage means adapted to store time information retrieved by time information retrieve means in association with a voice of the voice input. This allows the user to retrieve time information from the apparatus to ascertain the record time of the voice.

According to a sixth aspect of the present invention, the information recording apparatus according to the fifth aspect may have the display control means adapted to allow the display means to display the time information in conjunction with the aforementioned map image as well as a representation indicative of the voice input. This allows the user to ascertain the time (the time of day) of the voice utterance (speech utterance) on the map, thereby making it possible to determine the chronological order of the voice inputs. Display of such time information can remind the user of the memory at the time of the voice input, thereby allowing the user to roughly know the contents of the voice input without confirming the contents.

More specifically, the display control means may be adapted to display the time information textually or graphically around the mark indicative of the voice input displayed on the map image. This allows the user to keep track of when and where the voice has been uttered, while confirming the map.

For the information recording apparatus incorporated into a vehicle or the like, the apparatus is preferably provided with travel route storage means for storing the history of the travel route of the user by retrieving the current location from the current location positioning means, allowing the display means to display the history of the travel route overlapping the map image. This allows the user to ascertain how the user has traveled before the voice is stored. When a voice input regarding travel routes has been provided, this in turn makes it possible for the user to readily understand the contents of the voice input afterwards.

On the other hand, according to a seventh or eighth aspect of the present invention, the aforementioned information recording apparatus may have announcement control means for allowing announcement means, in accordance with a command to select a visible representation of a voice input, to announce a corresponding voice. This allows the user to not only confirm the contents of the stored voice in the information recording apparatus but also readily keep track of the contents of the voice associated with the record position.

Furthermore, according to a ninth aspect of the present invention, the information recording apparatus according to the eighth aspect may have the announcement control means adapted to cause announcement means to announce the stored voice as well as time information associated with the voice. This allows the user to confirm the voice contents as well as the record time. In this case, since the record time can be confirmed audibly, it is advantageously not necessary for the user to glance at the display window of the information recording apparatus to ascertain the record time while the user is traveling. In accordance with a selection of the user, the announcement control means may announce time information before and after the announcement of the contents of stored voice or alternatively may announce only the time information of the contents of the selected voice upon input of the user's command in no association with the announcement of the contents of stored voice.

In addition to the foregoing, according to a tenth aspect of the present invention, when there exist a plurality of voices to be stored on the storage means, the information recording apparatus according to any one of the third, and fifth to ninth aspects may have such display control means that allows the display means to display a list of voice inputs and a visible representation of a voice input, selected by the user on the list, at a position indicative of its current location in conjunction with a map image. This allows the user to readily ascertain the record position (the location of voice utterance) of the plurality of voices to be stored at their respective display device.

DETAILED DESCRIPTION OF THE PREFERRED EMBODIMENTS

Figure 1:
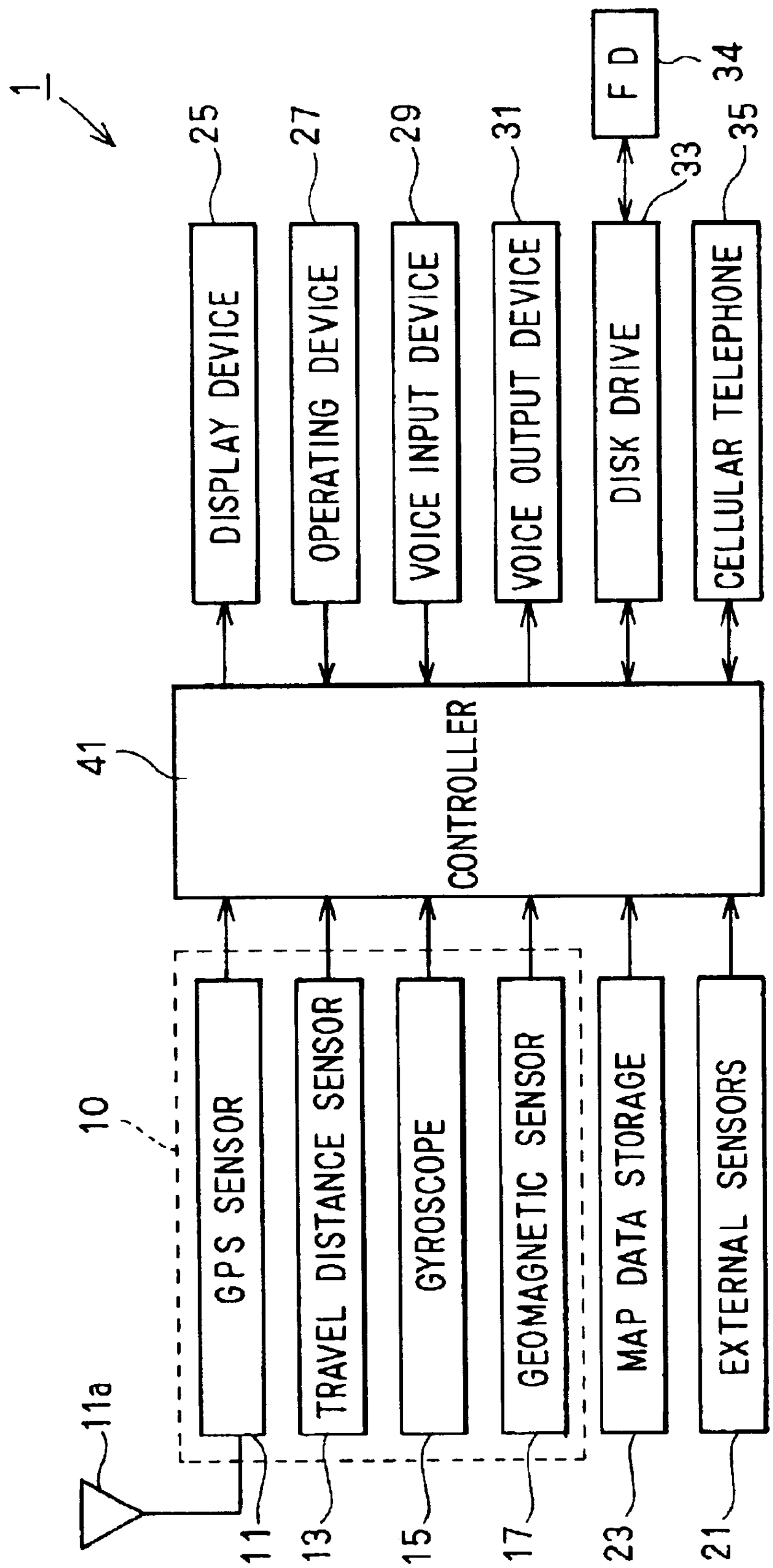
FIG. 1 is a block diagram illustrating a navigation system according to one embodiment of the present invention.

The present invention will be described with reference to the accompanying drawings. As shown in FIG. 1, the navigation system 1 includes a position-locating device 10, a map data storage device 23, a display device 25, an operating device 27, a voice input device 29, a voice output device 31, a disk drive 33, and a controller 41 that collectively control the entire navigation system 1 including these devices.

More specifically, the position-locating device 10 includes a GPS sensor 11 for receiving transmissions from GPS satellites via a GPS antenna 11*a*, to locate the current position of the vehicle, and a travel distance sensor 13, for determining the travel distance of the vehicle in accordance with signals from a vehicle speed sensor, a wheel speed sensor or the like. The position-locating device 10 also includes a gyroscope 15, for detecting the magnitude of turning movements applied to the vehicle, and a geomagnetic sensor 17, for determining the absolute orientation of the vehicle in accordance with geomagnetism. With this arrangement, the position-locating device 10 provides information containing errors of mutually different attributes from the sensors 11–17 to the controller 41, which compiles data by analyzing the pieces of information to determine the accurate current location of the vehicle.

The position-locating device 10 is not necessarily provided with all the aforementioned sensors, but may have only the GPS sensor, for example. In addition to these sensors, it is also possible to employ a steering angle sensor for sensing the right and left steering angles. Signals sensed by this sensor would allow the navigation system 1 to determine the location of the vehicle and the direction of its travel even more accurately.

On the other hand, the navigation system 1 is connected to a group of external sensors 21, which are located on the vehicle for determining conditions of the vehicle other than its position in accordance with data provided by the sensors 21. That is, for example, the navigation system 1 can acquire information regarding the temperature of the outside air from an outside-air temperature sensor serving as one of the group of sensors 21.

The display device 25 is provided to display, for the driver, in color, on a screen, a map including information on roads necessary for travel. For example, the controller 41 controls the display device 25 to display a map of surroundings, through which the vehicle travels, in accordance with the map information retrieved by the controller 41 from the map data storage device 23. The display device 25 also displays, in color, a current location mark 42, which indicates the current location of the vehicle, and a menu, which is described later, and messages for alerting the driver.

On the other hand, the map data storage device 23 includes a storage medium (e.g., CD-ROM, DVD, or memory card) or media, for storing various types of data necessary to display maps on the display device 25 or to present the destination route directed by the vehicle operator, and a decoder, for retrieving information from the storage medium to send to the read controller 41. The various types of data, stored on the storage medium include road data, map data, for displaying on the display screen a road map, buildings, parks, or rivers, and map matching data for identifying the roads, along which the vehicle is traveling, in accordance with the current vehicle location associated with the latitude and longitude provided by the GPS sensor 11.

The operating device 27 is provided for the vehicle operator to input various types of commands through external operations to the navigation system 1. The operating device 27 includes touch switches integrated with the display device 25 and arranged on the display screen, mechanical key switches 27*a* located around the display screen of the navigation system 1, and a voice recognition button 27*b* for the controller 41 to execute a voice recognition program, which is described later.

In this configuration, the touch switch includes an infrared sensor for scanning for infrared radiation on the screen of the display device 25. For example, a position at which the infrared radiation is interrupted with a finger or a touch pen is sensed as two-dimensional coordinates (X, Y). In other words, the touch switch on the operating device 27 is designed such that the vehicle operator may directly touch the screen to thereby input a desired command.

The voice input device 29 is designed to provide a voice-actuated control implemented by the voice recognition program to the navigation system 1 and to record the information voiced by the vehicle operator. The voice input device 29 includes a microphone 29*a* and an A/D (analog to digital) converter, in which a voice signal from the microphone 29*a* is converted into a digital signal, which is then sent to the controller 41.

On the other hand, the voice output device 31 includes a D/A (digital to analog) converter and a loudspeaker 31*a*, in which the digital voice signal received from the controller 41 is converted into an analog signal, which is then delivered as an audible message from the loudspeaker 31*a* to provide various information to the vehicle operator.

The disk drive 33 is primarily designed to read data on a floppy disk (FD) 34 to send data to the controller 41 and to write data received from the controller 41 onto the FD 34. In this embodiment, the voice data stored in the navigation system 1 can be written onto the FD 34 so that the vehicle operator can take the data from the vehicle.

The controller 41 is equipped with a well-known microcomputer comprising a CPU, ROM, and RAM. The controller 41 causes the CPU to execute programs stored on the ROM to perform the functions of the navigation system and control each device within the system.

For example, the controller 41 has a voice recognition program in the ROM, which is executed in response to a voice being inputted at the voice input device 29 and to the voice recognition button 27*b* of the operating device 27 being depressed. The controller 41 then determines whether the voice inputted by the vehicle operator matches the recognition words in the voice recognition dictionary stored in the ROM. If the voice matches the recognition words, the controller 41 determines that the vehicle operator has inputted the command associated with the recognition words and executes the predetermined operation corresponding to the command.

In the navigation system 1, there is also provided a connection port for connecting a cellular telephone 35. The controller 41 monitors the current status of the cellular telephone 35 (active or inactive). When the phone is active, the controller 41 sends to the cellular telephone 35 the voice signal of the vehicle operator spoken into the microphone 29*a* of the voice input device 29 and allows the voice of the calling party to be outputted from the loudspeaker 31*a* of the voice output device 31. At the same time, the controller 41 keeps the log of calls, as described later.

In addition, the controller 41 is provided with a map display mode as a basic function of the navigation system 1. When the vehicle operator depresses a current location switch 28*b* of the operating device 27, the controller 41 retrieves the current location of the vehicle from the position-locating device 10. At the same time, in accordance with the location information, the controller 41 retrieves map data of surroundings, through which the vehicle is traveling, from the map data storage device 23 to display the map of the surroundings at the display device 25 and the current location mark 42 of the vehicle or a voice mark 43 and a telephone mark 45, which is described later.

When the operator specifies a destination using the operating device 27, the controller 41 determines an optimal route to the destination using, for example, the DIJKSTRA method, in accordance with the current location, which is found by the position-locating device 10. Then, the controller 41 superimposes the route on the aforementioned map of the vehicle surroundings on the display device 25. After determining the route, the controller 41 causes the loudspeaker 31*a* of the voice output device 31 to provide the route information for the driver in response to the location of the vehicle so that the driver can drive the vehicle along the determined route to the destination.

Furthermore, the controller 41 is designed to allow the display device 25 to display a menu (not shown) when the vehicle operator depresses a MENU switch 28*a* of the operating device 27. In this manner, the vehicle operator can touch such switches displayed on the menu to choose various settings for the functions (including those unique to the navigation system 1 according to this embodiment) provided in the navigation system 1.

That is, the navigation system 1 according to this embodiment has various switches displayed on the menu. The switches include a voice record switch, for switching between active (ON) or inactive (OFF) states, the voice memo record function, for recording the voice of the vehicle operator from the microphone 29*a*, and a call record switch, for switching between active (ON) or inactive (OFF) states, and the call record function, for recording calls at the cellular phone. The switches further include a travel route storage switch, for switching between active (ON) or inactive (OFF) states, the travel route storage function, for recording the history of routes along which the vehicle has traveled, and a history display switch, for displaying a list of various data stored in the system using these functions and for causing the controller 41 to perform the history display process when particular data is selected in the list. The vehicle operator can only touch each switch displayed to switch it between ON and OFF states, thereby specifying whether to use those functions unique to the navigation system 1.

Figure 3:
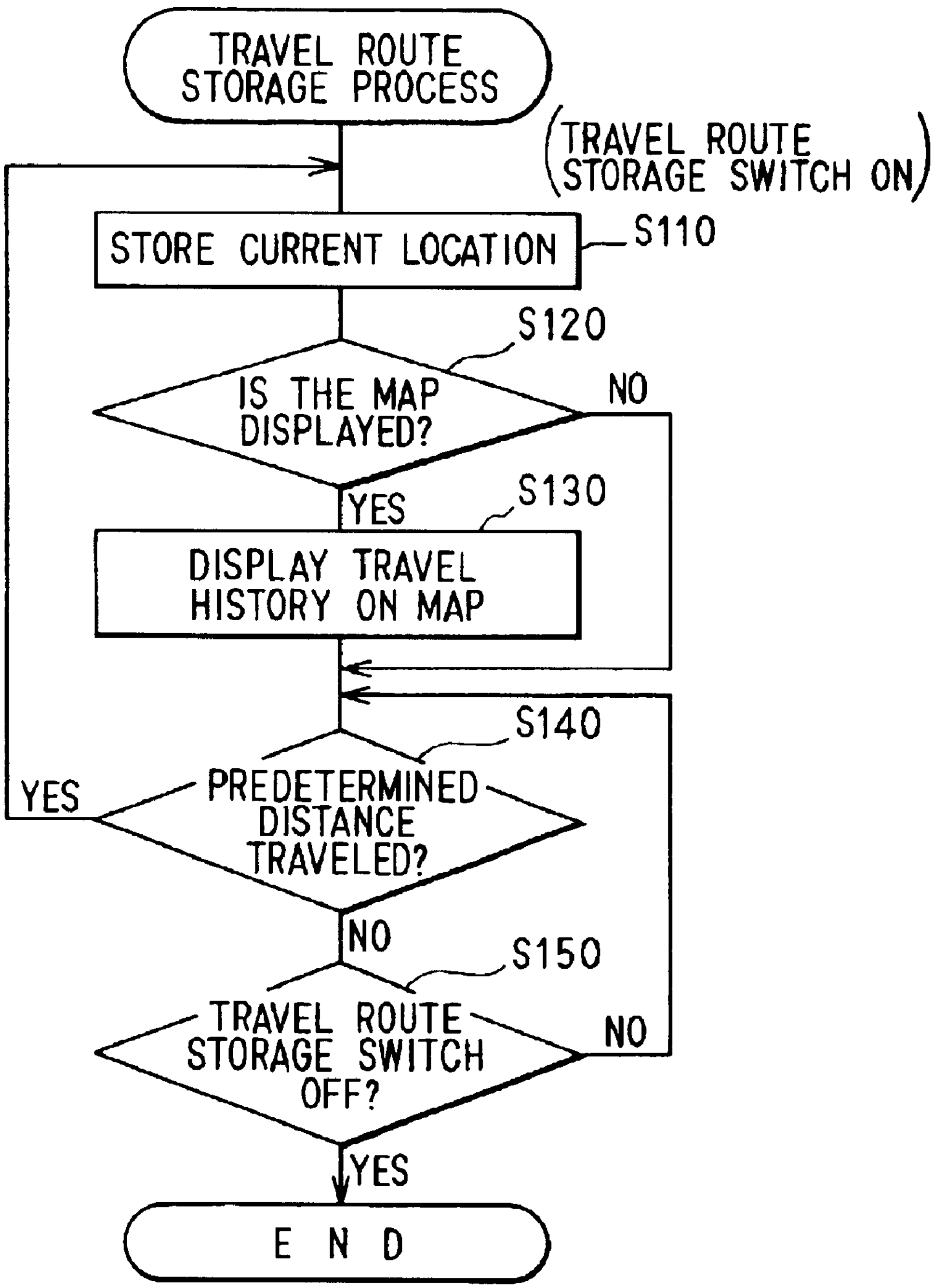
FIG. 3 is a flowchart illustrating a travel route storage process to be performed at by controller 41.

For example, when the vehicle operator has touched the travel route storage switch displayed on the menu to turn it ON, the controller 41 performs the travel route storage process shown in the flowchart of FIG. 3.

That is, when the travel route storage switch is turned ON, in step S110, the controller 41 retrieves information regarding the current location from each sensor at the position-locating device 10 to store the current location of the vehicle determined based on those pieces of information.

Then, in step S120, the controller 41 determines whether a map is displayed on the display device 25. If the map is displayed ("Yes" in step S120), then, in step S130, the controller 41 draws a colored line along the road on the displayed map to connect between the history of the current location of the vehicle stored through the previous process in step S110 and the current location, which has been stored in the current process in step S110. Thus, the controller 41 displays the current history of the travel route of the vehicle (referred to as the "travel history" and shown by a thick line in FIG. 2). On the other hand, if the controller 41 determines in step S120 that no map is displayed, step S140 is executed without performing the process of step S130.

Then, in step S140, in accordance with the location information retrieved from the travel distance sensor 13 at the position-locating device 10, the controller 41 determines whether the vehicle has traveled a predetermined distance from the current location retrieved in step S110. If the vehicle has traveled the predetermined distance ("Yes" in step S140), the process returns to step S110. On the other hand, if the vehicle has not traveled the predetermined distance ("No" in step S140), the process proceeds to step S150, where the controller 41 determines whether the vehicle operator has turned OFF the travel route storage switch on the menu. If the switch has been turned OFF (or "Yes" instep S150), the process ends, whereas if the switch is ON ("No" in step S150), the process returns to step S140.

By performing the process described above, the navigation system 1 can make a record of the travel route of the vehicle as a history, thereby allowing the driver to keep the travel history of his or her own vehicle. For the vehicle operator to easily manage its travel history, travel history data of the navigation system 1 according to this embodiment is stored on a daily basis in the RAM of the controller 41.

Now, the processes related to the voice memo record function and the call record function will be described below with reference to FIGS. 4A and 4B.

Figure 4A:
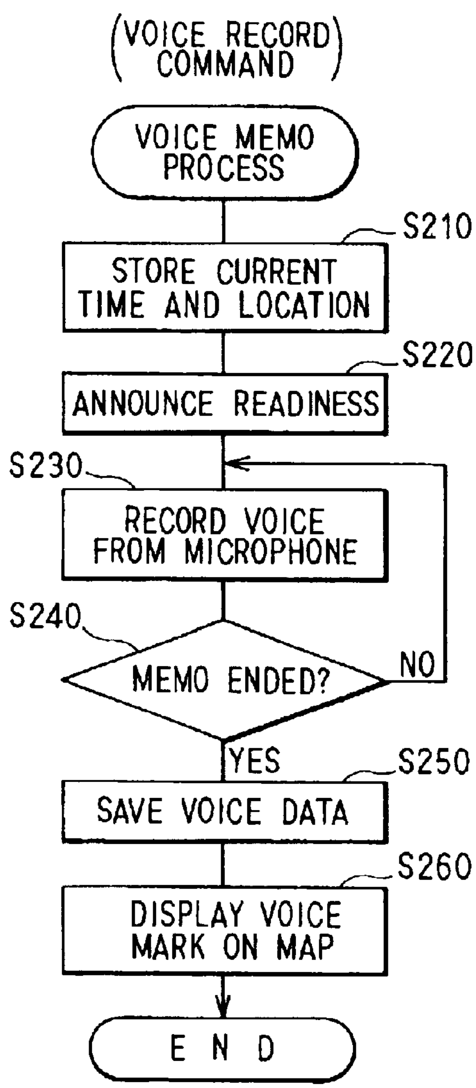
FIG. 4A shows a flowchart illustrating a voice memo process performed by the controller 41.

The voice memo process shown in FIG. 4A is performed at the controller 41 when the voice record switch at the menu is ON so that the voice memo record function is active. When the vehicle operator says "Memo" to the microphone while the voice recognition button 27*b* is depressed, the controller 41 determines that the vehicle operator has issued a voice record command and then performs this process.

That is, in step S210, once the voice memo process is started, the controller 41 first retrieves the current location of the vehicle from the position-locating device 10 to store the current location as a record position. At the same time, the controller 41 retrieves the current time (hereinafter referred to as the record time) from the internal clock provided by the controller 41 and stores it. The record time includes the date.

Then, instep S220, the controller 41 causes the loudspeaker 31*a* of the voice output device 31 to announce the message "Ready for recording" to the vehicle operator. At the same time, the controller 41 displays a recording mark (not shown), which indicates that sound is being recorded, on the display device.

Then, in step S230, the controller 41 makes a record of the voice input from the microphone 29*a* and stores the record it in the RAM. This operation continues until it is determined in step S240 that the vehicle operator has spoken the message "End the memo" ("Yes" in step S240). However, the vehicle operator may forget to say "End the memo" to the microphone 29*a*, and thus the controller 41 of this embodiment determines that the memo has ended ("Yes" in step S240) when no voice is input to the microphone 29*a* for a predetermined period of time.

If it is determined in step S240 that the memo has ended, then in step S250 the controller 41 stores the recorded voice data, which is associated with the record position and the record time stored in step S210, in the RAM so that the voice data cannot be deleted unless the vehicle operator commands the voice data to be deleted.

Then, in step S260, the controller 41 controls the display device 25 to display the voice mark 43 indicative of the record location on the map instead of the recording mark. At the same time, the controller 41 causes the display device 25 to display the record time beside the voice mark 43 (see the display device 25 shown in FIG. 2). Then, the voice memo process ends.

In the navigation system 1, it is usual to have a map displayed on the display device 25; however, it may happen that not a map but a menu or the like is displayed. In this case, the controller 41 controls the display device 25 to display a map of the surroundings (i.e., in the map display mode) and the voice mark 43 on the map.

Figure 4B:
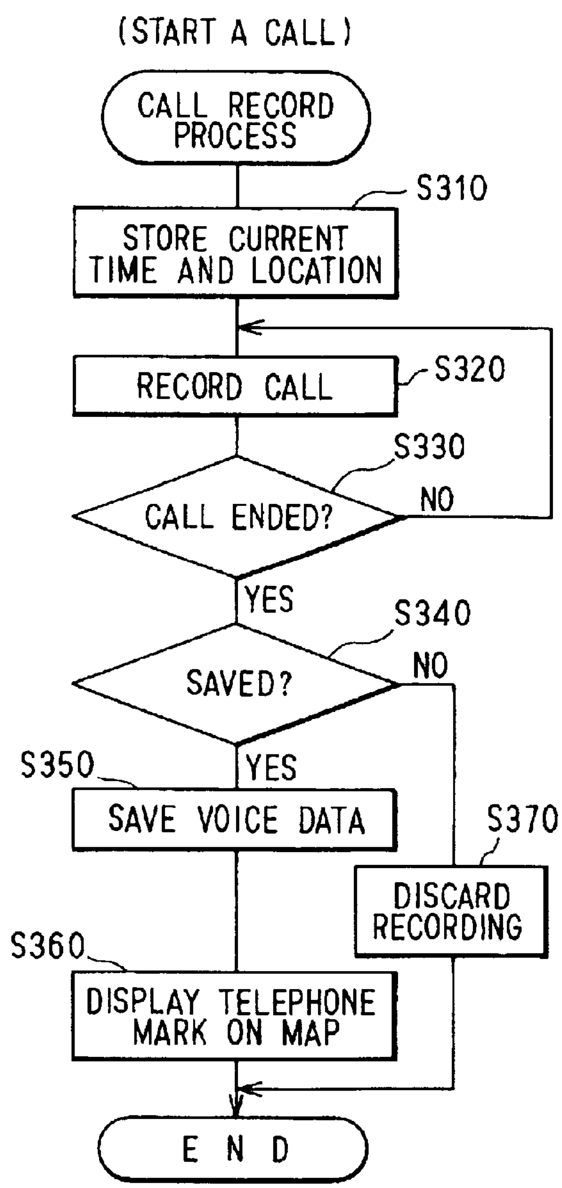
FIG. 4B shows a flow chart illustrating a call record process performed by the controller 41.

On the other hand, the call record process shown in FIG. 4B is performed at the controller 41 when the call record switch at the menu is ON so that the call record function is active. When the vehicle operator switches the cellular telephone 35, connected to the navigation system 1, from the inactive to active state, the controller 41 determines that the vehicle operator has started a call and then performs the process of FIG. 4B.

In step S310, once the call record process is started, the controller 41 first retrieves the current location of the vehicle from the position-locating device 10 and stores the current location as a call record position. At the same time, the controller 41 stores the current date and time (hereinafter referred to as the call record time).

Then, in step S320, the controller 41 makes a record of the call received by recording the voice signal from the cellular telephone 35. The controller 41 continues recording the call in the RAM until it is determined in step S330 that the cellular telephone 35 is switched from the active to the inactive state to end the call ("Yes" in step S330). At this time, as in the voice memo process, the controller 41 also displays a recording mark, indicating that the call is being recorded, at the call record position on the displayed map.

Then, in step S330, if it is determined that the call has ended ("Yes" in step S330), the controller 41 determines in step S340 whether the vehicle operator has instructed that the call be saved.

That is, in step S340, the controller 41 announces the message "Do you want to save the call?" to the vehicle operator. Then, the controller 41 determines whether the vehicle operator has depressed the voice recognition button

27*b* within a predetermined period of time and spoken the message "I want to save the call" into the microphone 29*a*. If so, the controller 41 determines that the vehicle operator has instructed that the call be saved and performs step S350.

In step S350, the controller 41 associates the voice data of the call recorded with the call record position and the call record time stored in step S310. The controller 41 saves the resulting data in the RAM so that the data cannot be deleted unless the vehicle operator instructs that the data be deleted.

Then, in step S360, the controller 41 displays the telephone mark 45 indicative of the call record position on the map (see the display device 25 shown in FIG. 2) and ends the call record process. If no map is displayed on the display device 25, then the same process mentioned with regard to the voice memo process is performed.

On the other hand, if it is determined in step S340 that the vehicle operator has issued no command to save the call, the controller 41 discards the recording of the call in step S370 and ends the process.

Figure 2:
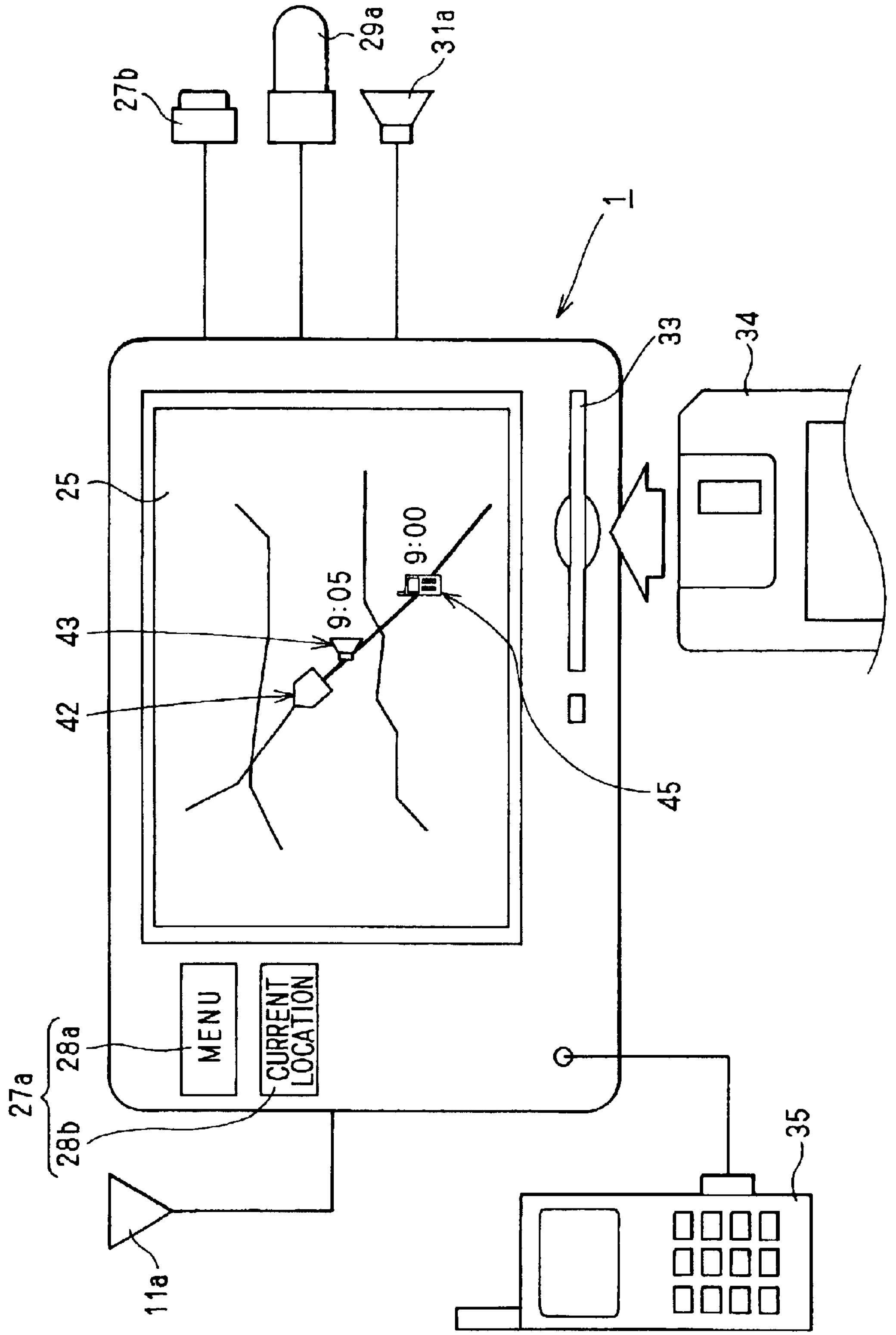
FIG. 2 is a diagrammatic front view illustrating the outer configuration of the navigation system 1.

The playback process that is performed by the controller 41 when the vehicle operator touches the voice mark 43 and the telephone mark 45 on the map shown in FIG. 2 will now be described. This playback process is performed to play back the voice data saved in the navigation system 1 in accordance with the flowchart of FIG. 5.

Figure 5:
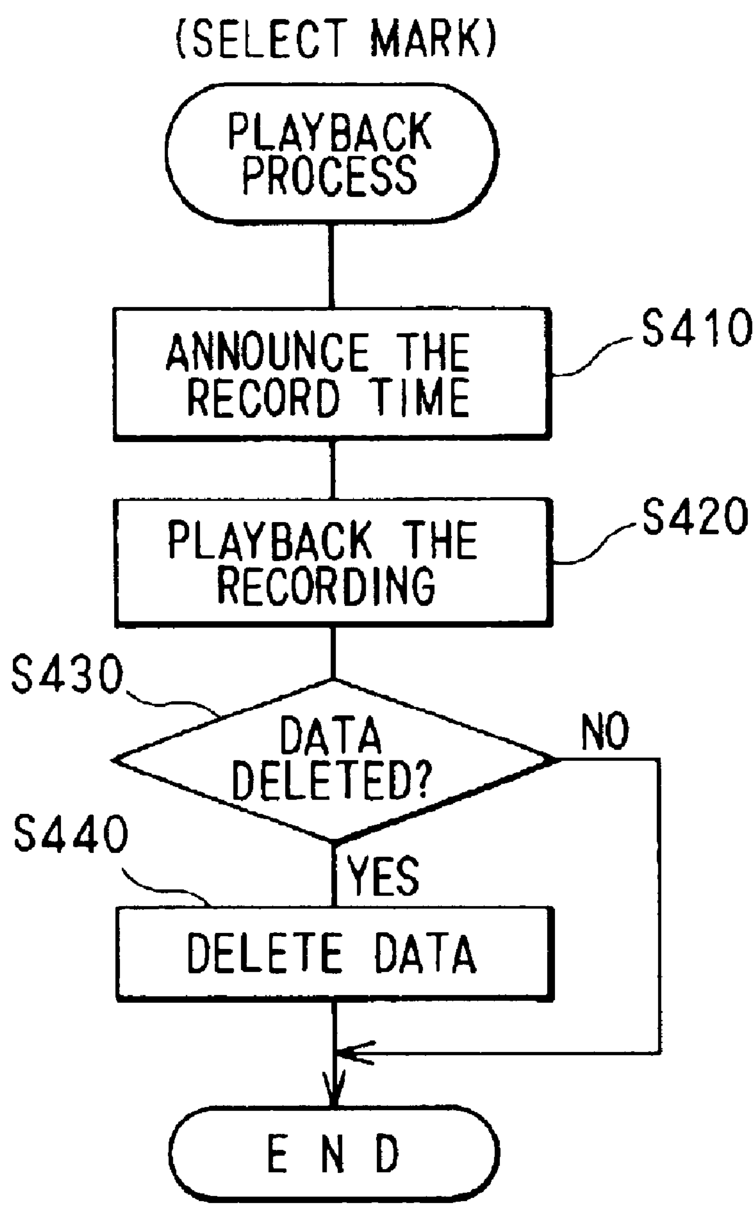
FIG. 5 is a flowchart illustrating a playback process performed by the controller 41.

As shown in FIG. 5, when the vehicle operator touches the voice mark 43 or the telephone mark 45 (hereinafter simply referred to as a mark), i.e., when a mark is selected, the controller 41 performs the playback process to announce the record time or the call record time (hereinafter referred to as the record time) of the voice data associated with the mark that has been touched.

In step S420, the controller 41 plays the corresponding voice data through the loudspeaker 31*a*.

After playing back the voice data recording, the controller 41 announces, in step S430, the message "Do you want the data to be deleted?" through the loudspeaker 31*a*. The controller 41 determines whether the vehicle operator has issued a command to delete the data within a predetermined period of time after the announcement.

That is, the controller 41 determines whether the vehicle operator has depressed the voice recognition button 27*b* and spoken the word "Delete" into the microphone 29*a* within a predetermined period of time after the announcement. If so, the controller 41 determines that the vehicle operator has issued a command to delete the data ("Yes" in step S430) and deletes the data (step S440). On the other hand, if the vehicle operator has not uttered "Delete" within a predetermined period of time, the controller 41 ends the playback process without deleting the data.

Thus, the navigation system 1 according to this embodiment allows the vehicle operator to save his or her recorded voice in conjunction with associated position information and visually confirm the record position on the map. Additionally, the vehicle operator need only touch the voice mark 43 to play back his or her voice. This makes it possible for the vehicle operator to easily associate the record position with the voice recording for the purpose of keeping a record of events.

That is, for example, when the vehicle operator finds a favorite restaurant during traveling, the vehicle operator can record details regarding the meal or other relevant information. Even when driver's recollection of the restaurant has become vague, the driver's memory can be refreshed by the recording.

Additionally, the vehicle operator may audibly record his or her impression of a scenic view the operator has experienced during traveling. In this case, by hearing the recording afterwards, the operator can be reminded of the experience in connection with the location and date. In particular, the navigation system 1 can store the travel history of the vehicle in the system while the travel route storage switch is in an ON state on the menu. This allows the vehicle operator to store his or her voice data in conjunction with the travel history in the navigation system 1 and thereby use the voice memo function in lieu of a diary or journal.

On the other hand, in cases where the navigation system 1 is used on business, the vehicle operator can use the voice memo function to keep a log of his or her job. That is, for example, suppose that the navigation system 1 is used for taxi services. In this case, the taxi driver can vocally store the locations of loading or unloading passengers, and vocally take memorandums of information regarding passengers such as their ages, thereby facilitating detailed management of his or her job. Consider another case where the navigation system 1 is used for home delivery service or collection and delivery service. In this case, the vehicle operator can store any detailed incidents in the system with a simple operation during service.

In addition, the navigation system 1 according to this embodiment makes it possible to record calls made with the cellular phone. This allows the vehicle operator to be reminded of the contents of the call by playing back the recording afterwards.

Thus, the navigation system 1 of this embodiment allows one to confirm the record position of the stored voice data on the map and then perform the history display process for making the data available.

Figure 6:
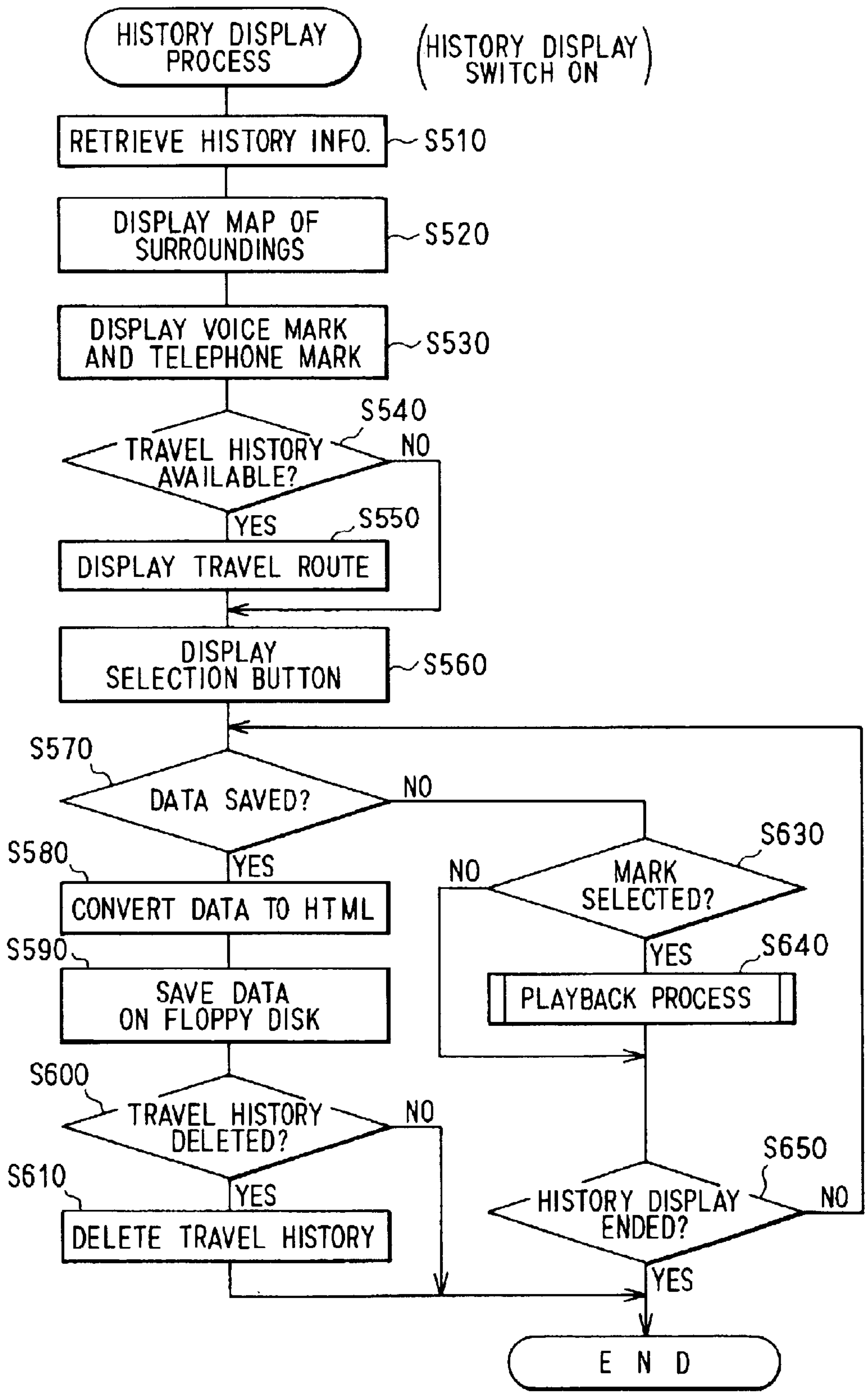
FIG. 6 is a flowchart illustrating a history display process performed by the controller 41.

The history display process to be performed by the controller 41 is described with reference to FIG. 6.

This history display process is performed by the controller 41 when the vehicle operator selects the history for a day the operator desires in the daily history list, which is displayed by touching the history display switch on the menu.

Once the process is started, the controller 41 first retrieves, in step S510, the history information for the selected day.

That is, in step S510, the controller 41 retrieves information such as the record position and the record time of the voice data stored in the RAM. In accordance with the information, in step S520, the controller 41 retrieves from the map data storage device an amount of map data that enables the record position of the voice data to be displayed, and then displays the map of the surroundings of the record position. Additionally, in step S530, the controller 41 superimposes the voice mark 43 and the telephone mark 45 on the map. At this time, the controller 41 displays the record time by text around the voice mark 43 and the telephone mark 45, and the current location mark 42 is displayed, when the range of the map is such that the current location of the vehicle can be displayed.

Figure 7:
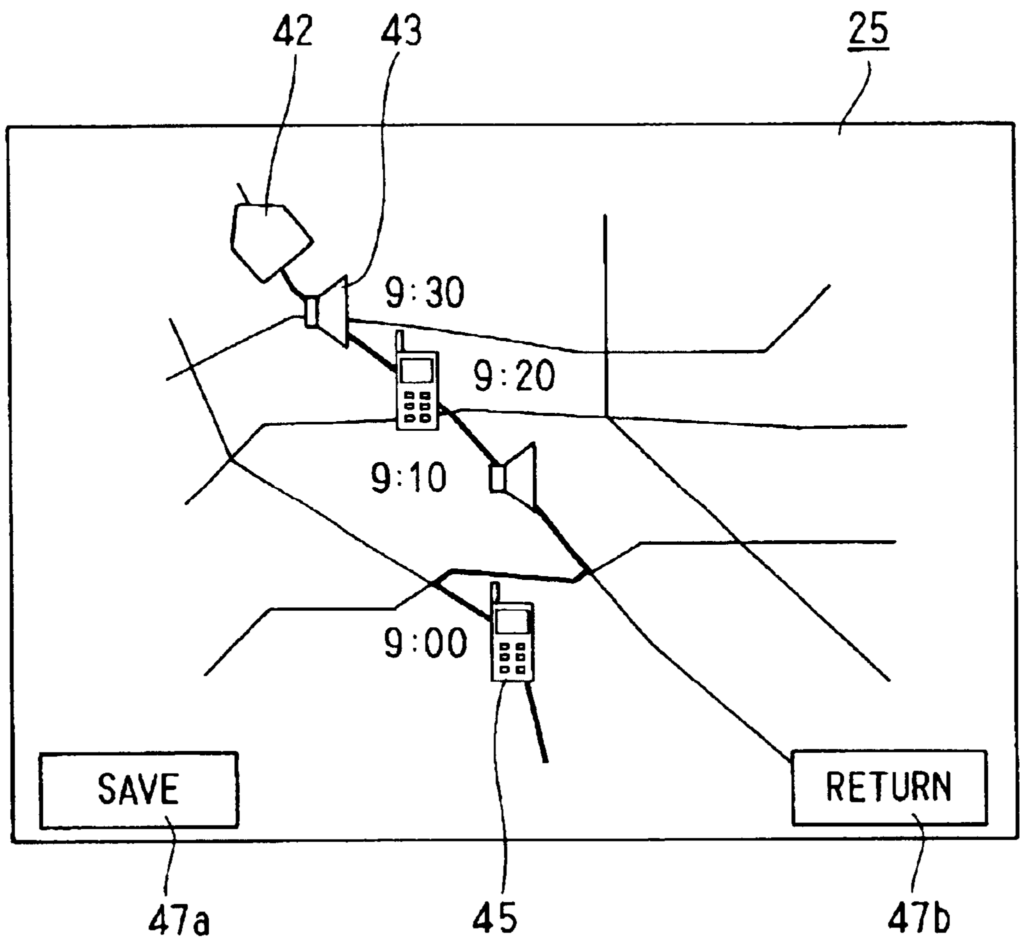
FIG. 7 is an explanatory front view diagram illustrating the configuration of a window displayed on a display device in the history display process.

Furthermore, in step S540, the controller 41 checks for the travel history of the selected day. If the travel history exists ("Yes" in step S540), the controller 41 displays the travel route superimposed on the map (step S550) and then proceeds to step S560. If no travel history is available ("No" in step S540), then in step S560, the controller 41 displays a selection button 47*a* marked with the message "Save" and a selection button 47*b* marked with the message "Return" at the bottom of the map, without performing the process in step S550. FIG. 7 is a diagram illustrating the display device

25 of the navigation system 1 when the steps S510 to S560 have been completed.

Then, the process proceeds to step S570, in which the controller 41 determines whether the vehicle operator has touched the selection button 47*a*. If the selection button 47*a* has been touched, the controller 41 determines that the vehicle operator has instructed that these histories be saved in the floppy disk (FD) 34. Instep S580, the controller 41 then converts the data regarding the histories in the well-known HTML (HyperText Markup Language)format, and instep S590, the controller 41 writes and saves the converted data onto the FD 34 in the disk drive 33.

That is, in step S580, the controller 41 converts the voice data of the selected day into voice data that can be played by a personal computer. For example the voice data may be saved in a format such as the WAVE format or the MP3 format (a format conforming to an audio compression standard of the Moving Picture Experts Group). At the same time, the controller 41 converts the image data, that indicates the record position of the voice data as the marks (the voice mark 43 and the telephone mark 45) on the map of the surroundings of the travel route on that day into image data that can be displayed on the monitor of a personal computer, in the GIF, TIFF, JPEG, or BMP format, for example.

Furthermore, when the marks of the image data are selected with the mouse of the personal computer (i.e., the mouse is clicked on the coordinates indicative of the marks), the controller 41 prepares a program file for playing back the voice data associated with the marks in the HTML format. In step S590, the controller 41 saves the converted voice data and image data, and the program file on the floppy disk. As a matter of course, if no travel history is available for that day, no travel route is shown with the image data.

When the process ends in step S590, the controller 41, in step S600, issues an audible message saying "Do you want the travel history to be deleted?" to the vehicle operator. At the same time, using a known technique, the controller 41 displays a sentence having the same contents on the display device 25 in conjunction with selection buttons "Delete" and "Do Not Delete" (not shown in the drawing). When the vehicle operator has touched the selection button marked with the word "Delete," the controller 41 determines that the vehicle operator has instructed that the travel history be deleted ("Yes" in step S600), and then performs step S610, in which the associated travel history is deleted. On the other hand, in step S600, when the vehicle operator has touched the selection button "Not Delete" displayed, the controller 41 ends the history display process without deleting the travel history ("No" in step S600). If no travel history is stored, the controller 41 does not provide the announcement of "Do you want the travel history to be deleted?" to the vehicle operator but determines that "No" has been selected in step S600 and then ends the history display process.

On the other hand, if it is determined in step S570 above that the vehicle operator has not touched the selection button 47*a*, the controller 41 causes the process to proceed to step S630, in which it is determined whether the marks (the voice mark 43 and the telephone mark 45) displayed on the window have been selected (or touched). If the marks have been touched ("Yes" in step S630), then in step S640, the controller 41 performs the aforementioned playback process shown in FIG. 5, thereby playing back the associated voice data and delivering the voice at the loudspeaker 31*a*.

When it is determined that the marks have not been selected in step S630 ("No" in step S630) or the process has ended the process in step S640, the controller 41 determines in step S650 whether the vehicle operator has touched the selection button 47*b*. If the selection button 47*b* has been touched, the controller 41 determines that the vehicle operator has commanded that the history display be ended and ends the corresponding process.

On the other hand, if it is determined that the selection button 47*b* has not been touched ("Not" in step S650), the controller 41 causes the process to return to step S570 to repeat the aforementioned steps.

Thus, the vehicle operator allows the navigation system 1 to write onto the FD 34 the voice data stored in the system using the voice memo function and the call record function and then allows a personal computer to read the data stored on the FD 34. This makes it possible for the vehicle operator to readily manage the voice data with the personal computer.

That is, the FD 34 could have not only voice data but also image data and program files in the HTML format, and software for displaying an HTML-formatted file or a so-called browser could also be installed in the personal computer. This makes it possible for the vehicle operator to play back the voice data or check the record position on the map, in the same sense as with the navigation system 1, only by allowing the software to read the data stored on the FD 34.

As a result, the vehicle operator can save the trouble of playing back the voice or the like stored in the navigation system 1, and accumulate data day by day for management.

In addition to the foregoing, it is also possible to periodically obtain data indicative of the temperature of outside air from an outside air temperature sensor provided as a member of the group of external sensors 21 external to the navigation system 1 and then store the data in the RAM of the controller 41 in conjunction with the position information of the vehicle retrieved from the position-locating device 10. This makes it possible to have voice data recorded in conjunction with information regarding to the weather (the temperature of outside air) of the day when the voice is recorded.

In the foregoing, the present invention has been described with reference to the configuration of the navigation system 1 according to the present invention and the process performed by the controller 41. The current location positioning means of the information recording apparatus according to the present invention corresponds to the operation of the controller 41 of positioning a current location in accordance with information from the position-locating device 10. The storage means corresponds to performance of the aforementioned voice memo process and the call record process to store a record position (or a location of recording) and a record time and save voice data. The communication means of the present invention corresponds to the cellular telephone 35 that is connected to the navigation system in this embodiment. The display means corresponds to the display device 25 of this embodiment, while the display control means corresponds to the operation of the controller 41 of controlling the display device 25 to display a map and the mark 43 or 45 on the map to make the voice input visible to the user. The time information retrieve means of the present invention corresponds to the operation of the controller 41 of retrieving time from its own internal clock when the controller 41 performs the aforementioned voice memo process and the call record process to store a record time in conjunction with a record position (in steps S210 and S310). The voice input means corresponds to the voice input device 29, while the announcement means corresponds to the voice output device 31. The announcement control means corresponds to the operation of the controller 41 of playing back record contents in the playback process, and then audibly delivering the contents from the voice output device 31.

In particular, the information recording apparatus of the present invention is adapted to record the voice of the user in conjunction with its record position. Thus, the present invention is not limited to the aforementioned embodiments without departing from the spirit and the scope of the invention but may take various forms.

For example, the navigation system 1 of this embodiment stores voice data in the memory (RAM) of the controller 41. However, instead of the memory, the navigation system can have a built-in hard disk drive for storing voice data therein. Since the hard disk is less expensive than the memory (RAM), the capacity of the navigation system for storing voice data can be increased at low costs.

The navigation system 1 also allows voice data stored in the system to be written onto the floppy disk (FD) 34 and thereby make the data available for external use. However, in addition to this, the cellular telephone 35 can be connected to the Internet so that data can be transmitted over the networks to an external device.

For example, to implement such a process in the navigation system 1, the history display process may be changed such that the vehicle operator operates the cellular telephone 35 to connect it to the Internet and then the controller 41 sends HTML-formatted data (step S580) not to the floppy disk but to the cellular telephone 35.

In addition, to store a plurality of voice recordings (voice data), the controller 41 may be adapted such that, in response to a command, issued by the user, to display a list of voice data, the controller 41 presents a list of stored voice data to allow the user to select one of the pieces of voice data listed, and a user's selection causes the selected voice data to be played back from the voice output device. Additionally, the control process may be adapted to present only the mark 43 or 45 corresponding to the selected voice data on the map. This makes it possible to clearly present recording positions to the user.

As shown in FIG. 4B, to make a record of calls, when it is determined that a call is ended in step S330, the control process may record the current location and the call end time at the time the call ended. Instep S360, the current time (i.e., the call start time) and position at the call start time recorded in step S310, and the call end time and position may be displayed on the window using the marks and characters indicative of the times.

On the other hand, the vehicle may incorporate a camera, which is in turn connected to the navigation system, to store an image provided by the camera in the system in conjunction with the record position and the record time of voice. This allows for confirming not only the voice but also the image in conjunction with its record position. As a matter of course, other than this, only the image instead of the voice may also be recorded in the control process in conjunction with the record position and the record time. This allows only the voice to be replaced by the image but advantageously allows something (like scenery) audibly inexpressible to be recorded in conjunction with its position. To this end, a communication port for receiving image data from an external device (camera) may be provided on the navigation system with the camera being connected to the communication port, thereby making it possible to record the image in the same manner as that of FIG. 4A.

On the other hand, in the foregoing, the present invention has been described with reference to an automobile navigation system as an example; however, the information recording apparatus of the present invention is not limited thereto but may be applied to a portable digital assistant typified by a cellular telephone.

What is claimed is:

1. An information recording apparatus comprising:

current location determining means for determining a current geographic location;

voice input means for receiving a voice input; and storage means for storing a recording of the voice input received by the voice input means and the current location determined by the current location determining means upon reception of the voice input in association with the voice input.

2. The information recording apparatus according to claim 1, further comprising communication means for conducting telephone calls, wherein the voice input received by the voice input means is a call conducted by the communication means.

3. The information recording apparatus according to claim 2, further comprising:

display means for displaying a predetermined map image from stored map data; and display control means for displaying on the display means a map image that includes a visible mark representing the voice recording at a position on the map image that corresponds to the voice input.

4. The information recording apparatus according to claim 3, further comprising time retrieval means for retrieving the current time, wherein the storage means stores data representing the time retrieved by the time retrieval means upon reception of a voice input by the voice input means, wherein the time data is stored in association with the corresponding voice input.

5. The information recording apparatus according to claim 4, further comprising:

announcement means; and announcement control means for causing the announcement means to audibly play the recording stored by the storage means, which is associated with the visible mark on the display, when a command to select the mark is issued.

6. The information recording apparatus according to claim 5, wherein the announcement control means also causes the announcement means to announce the time associated with the voice input of the recording.

7. The information recording apparatus according to claim 4, wherein the display control means causes the display means to display the time of a voice input in conjunction with a map image that includes the location of the voice input and a mark representing the voice input.

8. The information recording apparatus according to claim 3, further comprising:

announcement means; and announcement control means for causing the announcement means to audibly play the recording stored by the storage means, which is associated with the visible mark on the display, when a command to select the mark is issued.

9. The information recording apparatus according to claim 3, wherein the recording is one of a plurality of recordings associated with respective voice inputs, and the display control means causes the display means to display a list of stored voice inputs, each of which may be chosen by the user for retrieval.

10. The information recording apparatus according to claim 1, further comprising:

display means for displaying a predetermined map image from stored map data; and display control means for displaying on the display means a map image that includes a visible mark representing the voice recording at a position on the map image that corresponds to the voice input.

11. The information recording apparatus according to claim 10, wherein the recording is one of a plurality of recordings associated with respective voice inputs, and the display control means causes the display means to display a list of stored voice inputs, each of which may be chosen by the user for retrieval.

12. The information recording apparatus according to claim 1, further comprising time information retrieval means for retrieving the current time, wherein the storage means stores data representing the time retrieved by the time retrieval means upon reception of a voice input by the voice input means, wherein the time data is stored in association with the corresponding voice input.

13. The information recording apparatus according to claim 10, further comprising:

announcement means; and announcement control means for causing the announcement means to audibly play the recording stored by the storage means, which is associated with the visible mark on the display, when a command to select the mark is issued.

14. The information recording apparatus according to claim 10, further comprising time retrieval means for retrieving the current time, wherein the storage means stores data representing the time retrieved by the time retrieval means upon reception of a voice input by the voice input means, wherein the time data is stored in association with the corresponding voice input.

15. The information recording apparatus according to claim 14, further comprising:

announcement means; and announcement control means for causing the announcement means to audibly play the recording stored by the storage means, which is associated with the visible mark on the display, when a command to select the mark is issued.

16. The information recording apparatus according to claim 15, wherein the announcement control means also causes the announcement means to announce the time associated with the voice input of the recording.

17. The information recording apparatus according to claim 14, wherein the display control means causes the display means to display the time of a voice input in conjunction with a map image that includes the location of the voice input and a mark representing the voice input.

18. An information recording method comprising:

determining a current geographic location;

recording voice information in association with the location; and storing the voiced information in association with data representing the current location.

19. The method of claim 18, further comprising:

displaying a predetermined map image from stored map data; and displaying on the map image a visible mark representing the voiced information at a position on the map image that corresponds to the location at which the voice information was recorded.

20. The method according to claim 19, further comprising audibly playing the recording associated with the visible mark on the display when a command to select the mark is issued.

21. An information recording apparatus comprising:

current location determining means for determining a current geographic location;

voice input means for receiving a voice input;

storage means for storing a recording of the voice input received by the voice input means and the current location determined by the current location determining means upon reception of the voice input in association with the voice input; and time information retrieval means for retrieving the current time, wherein the storage means stores data representing the time retrieval by the time retrieval means upon reception of a voice input by tithe voice input means, wherein the time data is stored in association with the corresponding voice input.

22. An information recording apparatus comprising:

current location determining means for determining a current geographic location;

voice input means for receiving a voice input;

storage means for storing a recording of the voice input received by the voice input means and the current location determined by the current location determining means upon reception of the voice input in association with the voice input;

display means for displaying a predetermined map image from stored map data;

display control means for displaying on the display means a map image that includes a visible mark representing the voice recording at a position on the map image that corresponds to the voice input;

announcement means; and announcement control means for causing the announcement mean to audibly play the recording stored by the storage means, which is associated with the visible mark on the display, when a command to select the mark is issued.

23. An information recording apparatus comprising:

current location determining means for determining a current geographic location;

voice input means for receiving a voice input;

storage means for storing a recording of the voice input received by the voice input means and the current location determined by the current location determining means upon reception of the voice input in association with the voice input;

display means for displaying a predetermined map image from stored map data;

display control means for displaying on the display means a map image that includes a visible mark representing the voice recording at a position on the map image that corresponds to the voice input; and time retrieval means for retrieving the current time, wherein the storage means stores data representing the time retrieved by the time retrieval means upon reception of a voice input by the voice input means, wherein the time data is stored in association with the corresponding voice input.

24. The information recording apparatus according to claim 23, further comprising:

announcement means; and announcement control means for causing the announcement means to audibly play the recording stored by the storage means, which is associated with the visible mark on the display, when a command to select the mark is issued.

25. The information recording apparatus according to claim 24, wherein the announcement control means also causes the announcement means to announce the time associated with the voice input of the recording.

26. The information recording apparatus according to claim 23, wherein the display control means causes the display means to display the time of a voice input in conjunction with a map image that includes the location of the voice input and a mark representing the voice input.

27. An information recording apparatus comprising:

current location determining means for determining a current geographic location;

voice input means for receiving a voice input; and storage means for storing a recording of the voice input received by the voice input means and the current location determined by the current location determining means upon reception of the voice input in association with the voice input;

communication means for conducting telephone calls, wherein the voice input received by the voice input means is a call conducted by the communication means;

display means for displaying a predetermined map image from stored map data;

display control means for displaying on the display means a map image that includes a visible mark representing the voice recording at a position on the map image that corresponds to the voice input; and time retrieval means for retrieving the current time, wherein the storage means stores data representing the time retrieved by the time retrieval means upon reception of a voice input by the voice input means, wherein the time data is stored in association with the corresponding voice input.

28. The information recording apparatus according to claim 27, further comprising:

announcement means; and announcement control means for causing the announcement means to audibly play the recording stored by the storage means, which is associated with the visible mark on the display, when a command to select the mark is issued.

29. The information recording apparatus according to claim 28, wherein the announcement control means also causes the announcement means too announce the time associated with the voice input of the recording.

30. The information recording apparatus according to claim 27, wherein the display control means causes the display means to display the time of a voice input in conjunction with a map image that includes the location of the voice input and a mark representing the voice input.

31. An information recording apparatus comprising:

current location determining means for determining a current geographic location;

voice input means for receiving a voice input; and storage means for storing a recording of the voice input received by the voice input means and the current location determined by the current location determining means upon reception of the voice input in association with the voice input;

communication means for conducting telephone calls, wherein the voice input received by the voice input means is a call conducted by the communication means;

display means for displaying a predetermined map image from stored map data;

display control means for displaying on the display means a map image that includes a visible mark representing the voice recording at a position on the map image that corresponds to the voice input;

announcement means; and announcement control means for causing the announcement means to audibly play the recording stored by the storage means, which is associated with the visible mark on the display, when a command to select the mark is issued.

* * * * *